Patented Aug. 10, 1954

2,686,209

UNITED STATES PATENT OFFICE 2,686,209

PRODUCTION OF CYCLO-OLEFINIC COMPOUNDS

Hugh Wilma Boulton Reed, Norton-on-Tees, England, assignor to Imperial Chemical Industries Limited, a corporation of Great Britain No Drawing. Application October 31, 1952, Serial No. 318,108

Claims priority, application Great Britain November 19, 1951

7 Claims. (Cl. 260—666)

This invention relates to the production of olefinic compounds.

It has already been proposed to dimerise butadiene in a thermal non-catalytic process to produce cyclo-octa-1:5 diene together with 4-vinylcyclohex-1-ene. The ratio of cyclo-octa-1:5-diene to 4-vinylcyclohex-1-ene increases with increasing temperature, but, even at 270° C., the weight of cyclo-octa-1:5-diene present in the product is only 12% of the weight of 4-vinylcyclohex-1-ene. On the contrary, the present invention provides a process in which cyclo-octa-1:5-diene is the major product. More generally, it provides a process for the production of cyclo-olefinic compounds containing at least eight carbon atoms in the ring.

In co-pending U. S. application Serial No. 244,459 there is disclosed a process for the production of cyclo-olefinic compounds containing at least eight carbon atoms in the ring, which comprises the step of contacting a conjugated diolefinic compound in the presence of acetylene with a catalyst derived from nickel carbonyl by the replacement of at least one of the CO groups thereof with a compound of a trivalent element of the group consisting of nitrogen and phosphorus We have now found that improved results are obtained by the use of a catalyst derived from nickel carbonyl by the replacement of at least one of the CO groups thereof with an organic phosphite. When using a catalyst of this type, the presence of acetylene is no longer essential.

Thus, according to the present invention, there is provided a process for the production of cyclo-olefinic compounds containing eight carbon atoms in the ring, which comprises the step of contacting at elevated temperature a conjugated diolefinic compound with a catalyst derived from nickel carbonyl by the replacement of at least one of the CO groups thereof with an organic phosphite.

By-products produced in the process of the present invention include cyclo-olefines containing twelve and sixteen carbon atoms in the ring.

The preferred catalysts for use in the process have a formula:

where R is an alkyl, aryl or other organic radical, and $x$ has a value of one or two. More particularly, it is preferred to employ a catalyst having a structure:

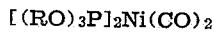

where R is phenyl or methyl. Catalysts employed in the present invention may be prepared in situ, e. g., the requisite amount of nickel carbonyl may be introduced into the reaction vessel together with the quantity of organic phosphite calculated to give the desired catalyst. Alternatively, the catalyst may be prepared externally and then introduced into the reaction vessel. Thus, bis (triphenyl phosphite) nickel dicarbonyl may be produced by adding two moles of triphenyl pohosphite to one mole of nickel carbonyl $Ni(CO)_4$ dissolved in ether, allowing the reaction to go to completion and removing the ether by distillation. The required amount of catalyst may then be introduced into the reaction vessel. This mode of operation has the advantage of allowing the amount and composition of the catalyst to be controlled with greater accuracy than when the catalyst is produced in situ.

The preferred starting material for use in the process of the present invention is butadiene, but alkyl derivatives of this, such as isoprene, may be employed.

It is an important feature of the present invention that the reaction may be carried out in the absence of added acetylene. When operating in this manner, the reaction is carried out by adding the conjugated diolefine to a solvent, as described hereinafter, and catalyst, and heating the mixture for a prolonged period, for example, 40 to 100 hours, at an elevated temperature of, for example, 100° to 130° C.

Operation in the absence of added acetylene produces cyclo-octa-1:5-diene of a high standard of purity. This compound has a boiling point at 760 mm. of 150° C., and at 144 mm. of 98° C. and its refractive index, $n_D^{20}$ is 1.4931. When operating in the absence of added acetylene, the only other compound formed in substantial amount is 4-vinylcyclohex-1-ene, which boils at 760 mm. at 131° C. In addition, small amounts of distillable compounds having higher molecular weights than cyclo-octa-1:5-diene or 4-vinylcyclohex-1-ene are formed.

When the process of the present invention is carried out in the presence of acetylene, the amount of distillable compounds of higher molecular weight than cyclo-octa-1:5-diene present in the reaction product is increased, and compounds derived from butadiene and acetylene are formed. Thus, a compound $C_{10}H_{14}$, formed from 2 molecules of butadiene and 1 of acetylene is produced in small amounts. This compound has a boiling point at 760 mm. of 169° C., and at 144 mm. of 110° C.; its refractive index $n_D^{20}$ is 1.4855.

Cyclic trimers and tetramers of butadiene are also present in the reaction product. For example, cyclododeca-1,5,9-triene and cyclohexadeca-1,5,9,13-tetraene are produced in the reaction. These compounds are not readily isolated owing to the presence in the reaction product of other compounds with similar physical properties. If, however, the reaction product is fractionated, two fractions, rich respectively in $C_{12}$ and $C_{16}$ hydrocarbons, may be obtained. The $C_{12}$ fraction, at 20 mm. pressure, boils in the range of 110°–115° C., and has a refractive index, $n_D^{20}$, of 1.5111. The $C_{16}$ fraction, at 0.8 mm. pressure, boils in the range of 93°–98° C., and has a refractive index, $n_D^{20}$ of 1.5472. These fractions, on hydrogenation and cooling, give respectively cyclododecane, M. Pt. 61° C., and cyclohexadecane, M. Pt. 57° C., in the form of white crystalline solids. It is believed that other large ring compounds, e. g. 8-vinylcyclodeca-1:5-diene, are present in the products from reactions of this type, but their separation in a high state of purity is rendered difficult by the complexity of the mixture and the similarity of boiling points of the compounds.

When acetylene is being employed it is conveniently introduced into the reaction vessel after the catalyst and a suitable solvent have been added. It is preferable to operate at an elevated pressure in excess of atmospheric and pressures up to 15 atmospheres are suitable; in particular, pressures in the range of 5 to 10 atmospheres are preferred. It is desirable to avoid operation with undiluted acetylene and it is therefore advantageous to introduce an inert gas such as nitrogen into the reaction vessel.

It should be understood that when carrying out the process of the present invention using acetylene, the conditions of operation must not contravene those laid down in Statutory Rules and Orders, 1947, No. 805; Explosive Substance; Compressed Acetylene Order.

When acetylene is employed in the process of the present invention, the catalyst is activated by heating the reaction vessel after the acetylene has been introduced. In general the activation process takes place at 100° C. and, since it is exothermic, the temperature rises. The activation process is not fully understood but it is believed to involve a reaction between the catalyst and acetylene. When this reaction is finished, the temperature falls again, it should then be maintained within the preferred range of 80° to 150° C., and more preferably between 100° to 130° C. The conjugated di-olefine may be added either before or after the catalyst activation. After the addition is complete, the mixture should then be heated for a period of, for example, 2 to 60 hours.

The process of the present invention is carried out in the liquid phase, using a solvent such as benzene, toluene or tetrahydrofuran. The catalyst may be added to this solvent together with, if desired, a small amount of 2:5-ditertiary butyl quinone, which tends to inhibit the formation of deleterious amounts of open-chain polymers. It is highly desirable to carry out the reaction under anhydrous conditions and in consequence the presence of a dehydrating agent is a valuable precaution.

When the reaction is complete, the volatile constituents of the reaction mixture are preferably removed as quickly as possible by vacuum distillation or steam distillation from polymeric material and catalyst. The volatile constituents are condensed, and the condensate distilled under vacuum in a precision still.

In general, some by-product formation will occur. Thus, when acetylene is employed, the polymerization of this may take place with the formation of, for example, benzene, styrene and cuprene.

The compounds prepared by the process of the present invention are useful, for example, in the production of derivatives of cyclic hydrocarbons containing eight or more carbon atoms in the ring. Thus, cycloocta-1:5-diene may be used for the production of compounds such as cyclo-octane and cyclo-octene, and for the production of open chain compounds, such as suberic acid.

In the examples given below, Example 1 illustrates operation in the absence of added acetylene, whereas in Examples 2, 3 and 4, acetylene is employed.

Example 1

A dry autoclave having a closely fitting glass liner was charged with 10 grams of bis(triphenyl phosphite) nickel dicarbonyl, 176 grams of benzene, 162.5 grams of butadiene and 0.2 gram of 2:5-di-tertiary butyl quinone. This mixture was heated under a nitrogen pressure of 3 atmospheres for 4 days at 100° C. On the third day an additional amount of 227.5 grams of butadiene was introduced. On analysis by steam distillation and precision fractionation, the product was found to contain 69 grams of cyclo-octa-1:5-diene and 35 grams of 4-vinyl cyclohexene. The cyclo-octadiene obtained in this example was substantially completely pure.

Example 2

An autoclave as described in Example 1 was charged with 176 grams of benzene, 0.2 gram of 2:5-di-tertiary butyl quinone, 162.5 grams of butadiene and 10 grams of bis(triphenyl phosphite) nickel dicarbonyl. The mixture was heated for 60 hours at 100° C. under a pressure of 3 atmospheres of nitrogen and 7 atmospheres of acetylene. Further quantities of acetylene were added at 6 hour intervals to maintain the acetylene pressure at its initial value. The product was steam distilled and the mixture of volatile organic compounds obtained was subjected to a precision distillation. The following compounds were isolated:

| | Grams |
|---|---|
| Cyclo-octa-1:5-diene | 117 |
| 4-vinylcyclohexene | 26 |
| A divinyl derivative of cyclohexene | 4 |

In addition a higher polymer was found to be present, but this was not identified. The cyclo-octa-1:5-diene obtained in this example contained a minor amount of styrene as an impurity.

Example 3

As described in Example 1 an autoclave was charged with 10 grams of bis(trimethyl phosphite) nickel dicarbonyl, 250 grams of benzene and 143.5 grams of butadiene. The mixture was heated to a temperature of 120° C. under an initial pressure of 7 atmospheres acetylene and 3 atmospheres nitrogen. The reaction mixture was maintained for 8 hours at this temperature, acetylene being added at hourly intervals to maintain the acetylene pressure at its initial value. During each addition of acetylene a momentary temperature rise to 145° C. occurred. The product was separated by steam distillation and precision fractionation and was found to contain:

| | Grams |
|---|---|
| Cyclo-octa-1:5-diene | 23 |
| 4-vinyl cyclohexene | 18 |
| A compound $C_{10}H_{14}$ believed to be a divinyl derivative of cyclohexene | 2 |
| A butadiene trimer | 17 |

*Example 4*

An autoclave was charged with 10 grams of bis(triphenyl phosphite) nickel dicarbonyl, 176 grams of benzene and 293 grams of butadiene. This mixture was heated under 3 atmospheres of nitrogen and 4.5 atmospheres of acetylene. The temperature was maintained at 100° C. for 48 hours. It should be noted that in this example acetylene was only introduced at the beginning of the reaction and not at frequent intervals as in Examples 1 and 3. The product was separated by steam distillation and precision fractionation and was found to contain:

| | Grams |
|---|---|
| Cyclo-octa-1:5-diene | 75 |
| 4-vinyl cyclohexene | 35 |
| A compound $C_{10}H_{14}$, believed to be a divinyl derivative of cyclohexene | 2 |
| A distillable residue believed to contain a substantial amount of butadiene trimer | 7 |
| Undistillable residue | 10 |

In this example, 44% of the butadiene employed has been converted to polymers of butadiene. Of this polymer 59% by weight is cyclo-octa-1:5-diene, 27% by weight is 4-vinyl-cyclohexene.

*Example 5*

An autoclave as described in Example 1 was charged with 5 grams of bis(trimethyl phosphite) nickel dicarbonyl, 176 grams of benzene and 162.5 grams of butadiene. Acetylene at 5 atmospheres pressure was added, and the mixture was heated at 150° C. for 7 hours. A further 162.5 grams of butadiene were added, fresh acetylene at a pressure of 5 atmospheres introduced, and the mixture again heated at 150° C. for 7 hours. At the end of this time, the above procedure was repeated, so that, in all, 487.5 grams of butadiene were employed in this example.

From the product, the excess of butadiene was removed, and the following compounds isolated:

| | Grams |
|---|---|
| Cyclo-octa-1:5-diene | 78.0 |
| 4-vinylcyclohex-1-ene | 36 |
| A compound $C_{10}H_{14}$, believed to be a di-vinyl cyclohexene | 2 |
| A trimer, B. Pt. 150–173° C. at 100 mm. pressure | 17 |
| A tetramer, B. Pt. 80–110° C. at 0.1 mm. pressure | 3.5 |

The trimer fraction was redistilled; at 20 mm. pressure a fraction weighing 10.8 grams was obtained which boiled at 108°–110° C., and had a rafractive index, $n_D^{20}$, of 1.5170. This fraction was hydrogenated using a platinum catalyst, and methyl acetate as a solvent. On removing the solvent by distillation, 4.0 grams of cyclododecane, melting at 61° C., were obtained.

The tetramer fraction was redistilled; at 0.8 mm. pressure, a fraction weighing 2.0 grams was obtained which boiled at 95°–100° C., and had a refractive index $n_D^{20}$ of 1.5470. This fraction, on hydrogenation as described for the trimer fraction, gave a small amount of cyclohexa-decane, M. Pt. 57° C.

I claim:

1. A process for the production of cyclo-olefinic compounds containing eight carbon atoms in the ring, which comprises the step of contacting at elevated temperature a conjugated open chain di-olefinic compound with a catalyst having the formula: $[(RO)_3P]_xNi(CO)_{4-x}$ wherein R is an organic radical and $x$ has a value of from 1 to 2.

2. A process as claimed in claim 1 in which the catalyst has a formula: $[(RO)_3P]_2Ni(CO)_2$ where R is a hydrocarbon radical selected from phenyl and methyl.

3. A process for the production of cyclo-olefinic compounds containing eight carbon atoms in the ring, which comprises the step of contacting butadiene at elevated temperature with a catalyst having a formula $[(RO)_3P]_2Ni(CO)_2$ where R is a hydrocarbon radical selected from phenyl and methyl.

4. A process for the production of cyclo-octa-1:5-diene which comprises the step of adding butadiene to a solvent containing a catalyst having the formula: $[(RO)_3P]_2Ni(CO)_2$ where R is a hydrocarbon radical selected from phenyl and methyl, heating the mixture at a temperature of 100° to 130° C. for a period of 40 to 100 hours.

5. A process for the production of mixtures of cyclo-olefinic compounds containing eight, twelve and sixteen carbon atoms in the ring, which comprises the step of contacting at elevated temperature and in the presence of acetylene a conjugated open chain diolefinic compound with a catalyst having the formula: $[(RO)_3P]_xNi(CO)_{4-x}$ wherein R is an organic radical and $x$ has a value of from 1 to 2.

6. A process for the production of mixtures of cyclo-olefinic compounds containing eight, twelve and sixteen carbon atoms in the ring, which comprises the step of contacting butadiene at a temperature of 80° to 150° C. and in the presence of acetylene with a catalyst having a formula: $[(RO)_3P]_2Ni(CO)_2$ where R is a hydrocarbon radical selected from phenyl and methyl.

7. A process as claimed in claim 6 in which acetylene is maintained in the reaction vessel at a pressure of at most 15 atmospheres.

References Cited in the file of this patent

UNITED STATES PATENTS

| Number | Name | Date |
|---|---|---|
| 2,631,173 | Hillyer et al. | Mar. 10, 1953 |

OTHER REFERENCES

Foster, Jour. Am. Chem. Soc., vol. 70, pages 2303–05 (1948).

Berkman et al., "Catalysis," Reinhold Publ. Corp., 330 W. 42nd St., N. Y.; page 976 (1940).